United States Patent
Leelanivas et al.

(10) Patent No.: US 7,787,466 B1
(45) Date of Patent: *Aug. 31, 2010

(54) NEXTHOP TO A FORWARDING TABLE

(75) Inventors: Manoj Leelanivas, Los Gatos, CA (US);
Ravi Vaidyanathan, Fremont, CA (US);
Ken Kuwabara, Sunnyvale, CA (US);
Steven Lin, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 11/460,195

(22) Filed: Jul. 26, 2006

Related U.S. Application Data (63) Continuation of application No. 10/063,216, filed on Mar. 29, 2002, now Pat. No. 7,106,740.

(60) Provisional application No. 60/345,663, filed on Jan. 2, 2002.

(51) Int. Cl.
H04L 12/56 (2006.01)

(52) U.S. Cl. .................................................. 370/392

(58) Field of Classification Search ........................ None
See application file for complete search history.

(56) References Cited

U.S. PATENT DOCUMENTS

| | | | | |
|---|---|---|---|---|
| 5,905,725 | A * | 5/1999 | Sindhu et al. | 370/389 |
| 6,192,051 | B1 * | 2/2001 | Lipman et al. | 370/389 |
| 6,463,067 | B1 * | 10/2002 | Hebb et al. | 370/413 |
| 6,658,482 | B1 * | 12/2003 | Chen et al. | 709/245 |
| 6,711,661 | B1 * | 3/2004 | Zabarski et al. | 711/202 |
| 6,798,777 | B1 * | 9/2004 | Ferguson et al. | 370/392 |
| 6,804,230 | B1 * | 10/2004 | Jennings et al. | 370/388 |
| 6,914,883 | B2 * | 7/2005 | Dharanikota | 370/230.1 |
| 6,917,620 | B1 * | 7/2005 | Sindhu et al. | 370/401 |
| 7,085,235 | B2 * | 8/2006 | Pin et al. | 370/235 |
| 7,106,740 | B1 * | 9/2006 | Leelanivas et al. | 370/392 |
| 7,111,071 | B1 * | 9/2006 | Hooper | 709/238 |
| 7,212,531 | B1 * | 5/2007 | Kopelman et al. | 370/392 |
| 7,215,637 | B1 * | 5/2007 | Ferguson et al. | 370/230.1 |
| 7,616,646 | B1 * | 11/2009 | Ma et al. | 370/401 |
| 7,688,727 | B1 * | 3/2010 | Ferguson et al. | 370/230.1 |
| 2001/0010692 | A1 * | 8/2001 | Sindhu et al. | 370/395 |
| 2001/0039591 | A1 * | 11/2001 | Nomura et al. | 709/238 |
| 2002/0003795 | A1 * | 1/2002 | Oskouy et al. | 370/389 |
| 2002/0080798 | A1 * | 6/2002 | Hariguchi et al. | 370/395.31 |
| 2002/0085567 | A1 * | 7/2002 | Ku et al. | 370/396 |
| 2002/0129086 | A1 * | 9/2002 | Garcia-Luna-Aceves et al. | 709/200 |
| 2002/0163916 | A1 * | 11/2002 | Oskouy et al. | 370/395.31 |
| 2003/0058860 | A1 * | 3/2003 | Kunze et al. | 370/392 |
| 2003/0108056 | A1 * | 6/2003 | Sindhu et al. | 370/401 |
| 2005/0122966 | A1 * | 6/2005 | Bowes | 370/360 |
| 2005/0175005 | A1 * | 8/2005 | Brown | 370/389 |
| 2005/0201396 | A1 * | 9/2005 | Sindhu et al. | 370/401 |

(Continued)

*Primary Examiner*—Ayaz R Sheikh
*Assistant Examiner*—Timothy J Weidner
(74) *Attorney, Agent, or Firm*—Harrity & Harrity, LLP (57) ABSTRACT

A router receives destination address information for a packet and determines, among entries in a first forwarding table, a closest match for the received destination address information. The router receives a pointer to a second forwarding table in accordance with the closest match determined in the first forwarding table and determines, among entries in the second forwarding table, a closest match for the received destination address information.

19 Claims, 6 Drawing Sheets

U.S. PATENT DOCUMENTS

| | | | |
|---|---|---|---|
| 2006/0023719 A1* | 2/2006 | Sindhu et al. | 370/392 |
| 2007/0147257 A1* | 6/2007 | Oskouy et al. | 370/238 |
| 2008/0031252 A1* | 2/2008 | Oskouy et al. | 370/392 |
| 2009/0109975 A1* | 4/2009 | Sindhu et al. | 370/392 |
| 2009/0268740 A1* | 10/2009 | Sindhu et al. | 370/392 |

* cited by examiner

NEXTHOP TO A FORWARDING TABLE

RELATED APPLICATIONS

This application is a continuation of U.S. patent application Ser. No. 10/063,216 filed Mar. 29, 2002, which claims priority under 35 U.S.C. §119 based on U.S. Provisional Application No. 60/345,663, filed Jan. 2, 2002, 2002, the entire disclosures of which are incorporated herein by reference.

BACKGROUND OF THE INVENTION

In a conventional computer network (e.g., the Internet), computers communicate over a network infrastructure made up of interconnected nodes, such as routers and/or switches, connected by communication links such as optical fiber, copper cable, and wireless links. Typically, the topology of the network infrastructure is configured in such a way that the infrastructure contains more than one path through which data may be carried from one computer to another. The topology, for example, may include a partial mesh configuration, where a node is connected to multiple other nodes. A router in such a network, therefore, may contain a plurality of interface ports for connection to multiple neighboring routers.

Such a router typically receives data in discrete units (herein referred to as "packets," which may include frames, cells, packets, or any other fixed- or variable-sized unit of data) at one or more of its ingress interface ports. The router examines destination address information embedded in the packets and determines the appropriate egress interface ports for outputting the respective packets, typically by performing a table lookup. To construct and update tables, routers may use dynamic routing protocols to systematically exchange information with other devices in the network to obtain a view of the network topology (this information being maintained in a routing database, such as one or more routing tables). Based on this information, the router constructs and updates a forwarding table, which associates ranges of destination addresses to respective egress interface ports.

In some cases, a router may use more than one forwarding table for forwarding packets. For example, a router carrying traffic for both a virtual private network ("VPN") and a public network (such as the Internet) may use one forwarding table for VPN traffic and a different forwarding table for public network traffic. The router has a set of ingress and egress interface ports dedicated to carrying VPN traffic and a set of ingress and egress interface ports dedicated to carrying public traffic. The router distinguishes traffic according to which ingress interface port respective packets are received at.

Such an approach, however, does not permit the router to pass packets from the VPN to the public network and vice-versa. One approach for permitting such passing is to include static routes in the VPN forwarding table, which contain nexthops to interfaces connected to the public network. Static routes, however, do not allow dynamic updates if changes in the network occur.

Thus, there is a need for an invention that more adequately addresses problems occurring in the network.

SUMMARY OF THE INVENTION

It is to be understood that both the foregoing general description and the following detailed description are exemplary and explanatory only and are not restrictive of the invention, as claimed.

In one embodiment of the invention, a route lookup processor in a router receives destination address information for a packet and determines, among entries in a first forwarding table, a closest match for the received destination address information. The route lookup processor receives a pointer to a second forwarding table in accordance with the closest match determined in the first forwarding table and determines, among entries in the second forwarding table, a closest match for the received destination address information.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

As described in greater detail below, a router may use two or more forwarding tables for packet forwarding. According to the invention, at least one of the tables includes at least one entry containing a pointer to another table. After the pointer is returned in response to a first lookup operation, a second lookup operation is performed in the forwarding table identified by the pointer.

Figure 1A:
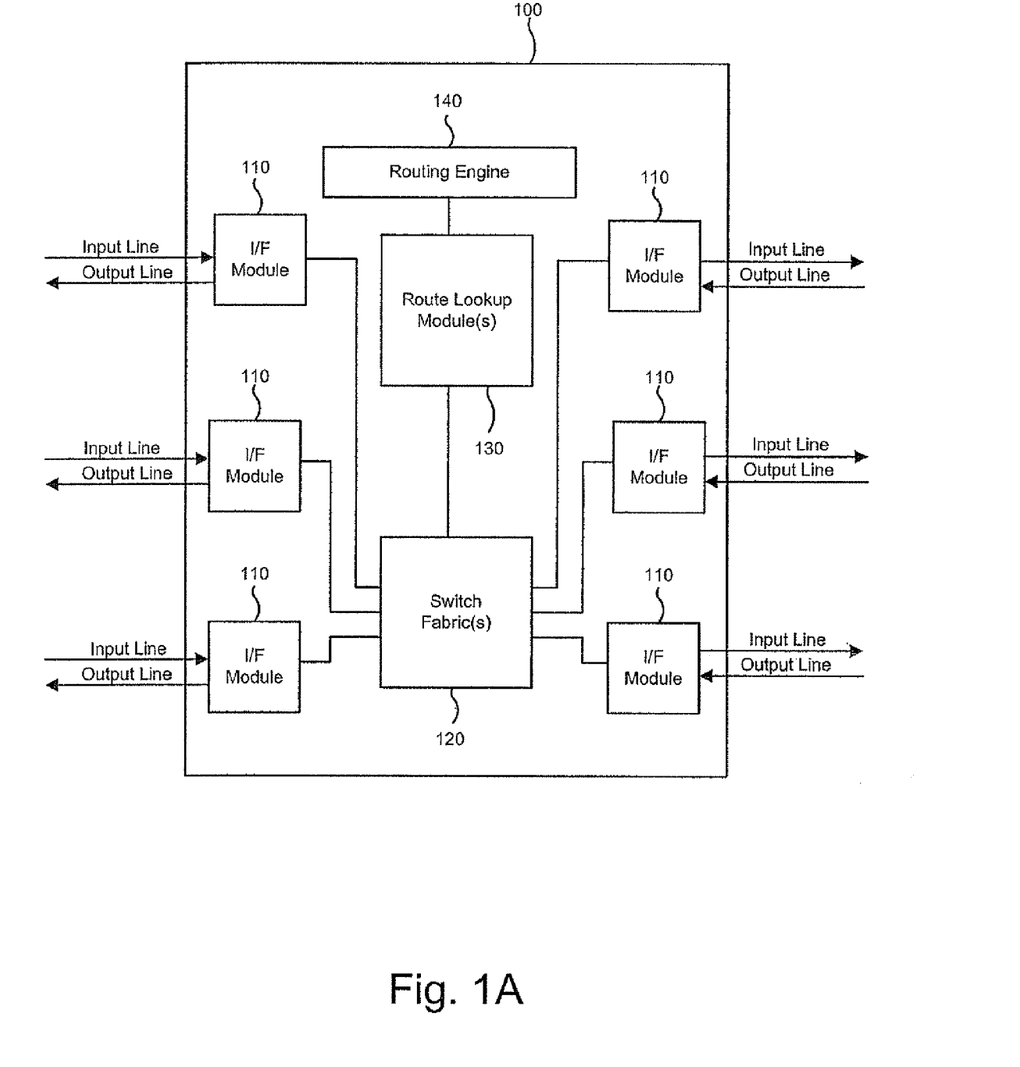
FIG. 1A is a block diagram of a router incorporating principles of the invention according to a first embodiment.

FIG. 1A shows router 100. Generally, router 100 receives packets on the input lines and determines the output lines from which the packets are to be output. As shown in FIG. 1A, router 100 includes a plurality of interface (I/F) modules 110, switch fabric(s) 120, route lookup module(s) 130, and routing engine 140. Each I/F module 110 connects to one or more respective input lines and/or output lines.

Each I/F module 110 contains one or more ingress interface ports (not shown) for receiving packets from respective input lines and/or one or more egress interface ports (also not shown) for transmitting packets to respective output lines. I/F module 110 may perform processing on the headers of respective packets (e.g., layer 2/3 header processing) so the packets are in the appropriate format for processing through switch fabric 120 (for packets received at the ingress interface ports) and for transmission over the output lines (for packets to be sent out the egress interface ports). In one embodiment, I/F modules 110 are implemented as circuit boards that are insertable and removable from router 100. One or more I/F modules 110 may be inserted at a time.

Switch fabric 120 contains logic for receiving packets from I/F modules 110 and for transmitting packets out to I/F modules 110. In one embodiment, switch fabric 120 may contain buffer memory for storing received packets. In another embodiment, switch fabric may be a cross-connect connecting sets of I/F modules 110 with buffer memory contained in respective I/F modules 110. Switch fabric 120 preferably provides packet header information (e.g. destination address information) for received packets to route lookup module 130 and receives identifiers specifying which egress interface ports in the I/F modules 110 to forward the packets to.

Each of route lookup module(s) 130 examines characteristics of packets flowing through switch fabric 120 to determine the manner in which the packets are to be forwarded (e.g., determining the egress interface ports from which respective packets are to be output). In one embodiment, route lookup module 130 examines packet header information for respective packets, which may include performing table lookups using one or more forwarding tables. In one embodiment, route lookup module 130 includes a lookup processor and open or more forwarding tables stored in memory. The lookup processor may be implemented in hardware as circuit logic for carrying out the respective operation or as one or more processors programmed to carry out the operation.

Routing engine 140 maintains a database of routing information which may be received in routing messages from other routers using routing protocols. Routing engine 140 preferably generates forwarding tables which are transmitted to route lookup module 130. Routing engine 140 systematically receives updated information reflecting changes in the network, updates its database (which may be stored as routing tables), generates one or more forwarding tables from the database, and transmits the forwarding table to route lookup module 130. Routing engine 140 preferably comprises a processor executing routing protocols for computing routes and/or network topology.

Figure 1B:
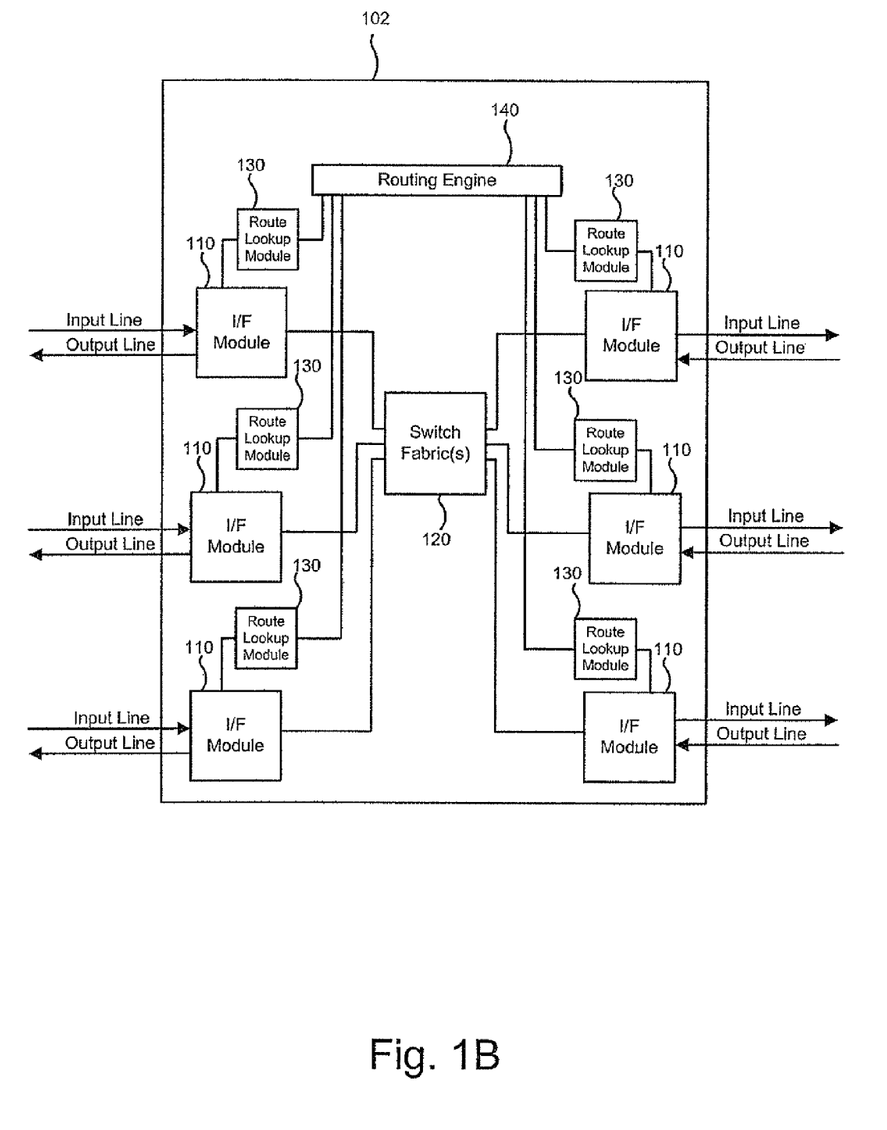
FIG. 1B is a block diagram of a router incorporating principles of the invention according to a second embodiment.

FIG. 1B is a block diagram of router 102. Router 102 is similar to router 100, except that each I/F module 110 has a corresponding mute lookup module 130 connected to it. In addition, routing engine 140 connects to each of the route lookup modules 130. Router 102 operates in a manner similar to router 100, except that a lookup operation is performed by the route lookup module 130 corresponding to the I/F module 110 at which packets are received. I/F modules 110 provide packet header information to the corresponding route lookup modules 130 and receive egress interface port information for each packet. I/F modules 110 transmit the packets and received egress interface port information to switch fabric 120, which forwards the packets to the appropriate I/F modules 110. To carry out this operation, each I/F module 110 in router 102 may contain buffer memory for storing packets.

FIGS. 1A and 1B show different embodiments of routers that may be used with the invention. In alternative embodiments, the invention may be used with other router or switch architectures or in any device that performs packet forwarding.

Figure 2:
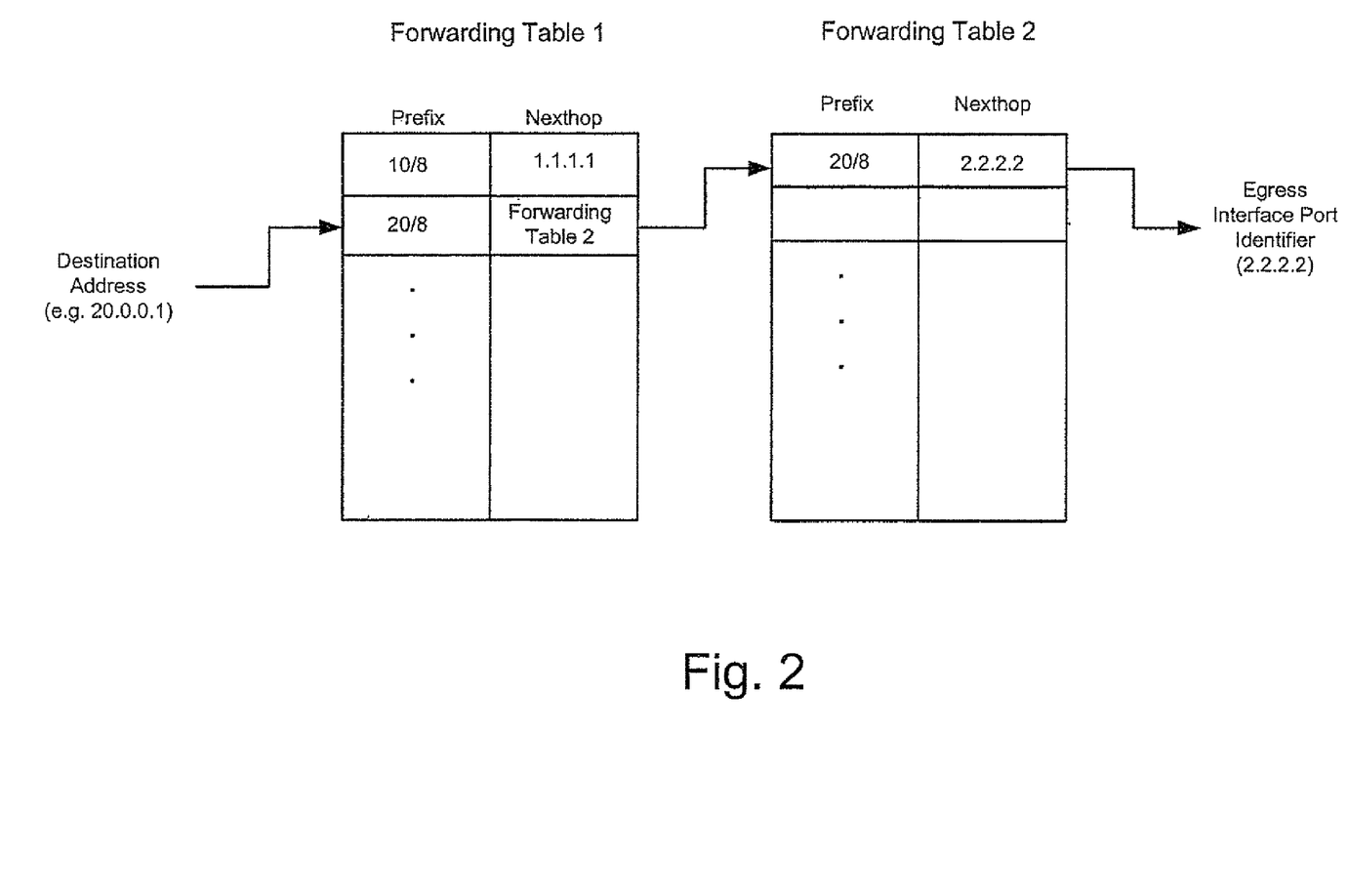
FIG. 2 illustrates an example of two forwarding tables which may be used in a router (or other packet forwarding device) according to the invention.

FIG. 2 shows an example of two forwarding tables which may be used in a router (or other packet forwarding device) according to the invention. As shown in FIG. 2, forwarding table 1 contains a plurality of entries, each associating a range of addresses (shown as "prefix") to a corresponding nexthop (which may include egress interface port identifiers and/or addresses of neighboring nodes). At least one of the entries in forwarding table 1 contains a nexthop that points to forwarding table 2. When a destination address is received by the route lookup module, a lookup processor (not shown) determines a closest match between the received destination address and a prefix in forwarding table 1. In the example shown in FIG. 2, the closest match is the entry containing prefix 20/8. The nexthop contained in that entry points to forwarding table 2. The lookup processor then performs a lookup operation in forwarding table 2 to determine the closest match between the destination address and a prefix in forwarding table 2. In this example, the closest match is 20/8, which is associated with egress interface port identifier 2.2.2.2. In alternative embodiments, lookup techniques other than closest match may be used. In addition, other types of entries may be included in these tables.

FIG. 2 shows two forwarding tables with one entry in forwarding table 1 containing a pointer to forwarding table 2. In other embodiments, more than two forwarding tables may be used and each forwarding table may contain one or more pointers to other forwarding tables. Each forwarding table may also have a default entry which is selected if none of the other entries adequately satisfies the closest match determination. In addition, each entry in a table may associate address ranges (prefixes) to not only egress interface port identifiers, but also addresses of the neighboring nodes (e.g., nexthops) to which the respective packet is to be forwarded. This may be used, for example, if the egress interface port is an Ethernet port.

In other embodiments, the forwarding tables and their entries may use different types of data and may arrange them in different data structures. For example, rather than including interface port identifiers and table pointers directly in the forwarding tables, one or more levels of indirection could be incorporated. For example, the forwarding tables could associate address ranges to pointers to entries in a nexthop resolution table. The nexthop resolution table contains entries associating nexthop identifiers to actions to be performed (such as forwarding a packet to a particular egress interface port or performing a lookup in another table). Alternatively, these entries could also perform another level of indirection to another table.

Figure 3:
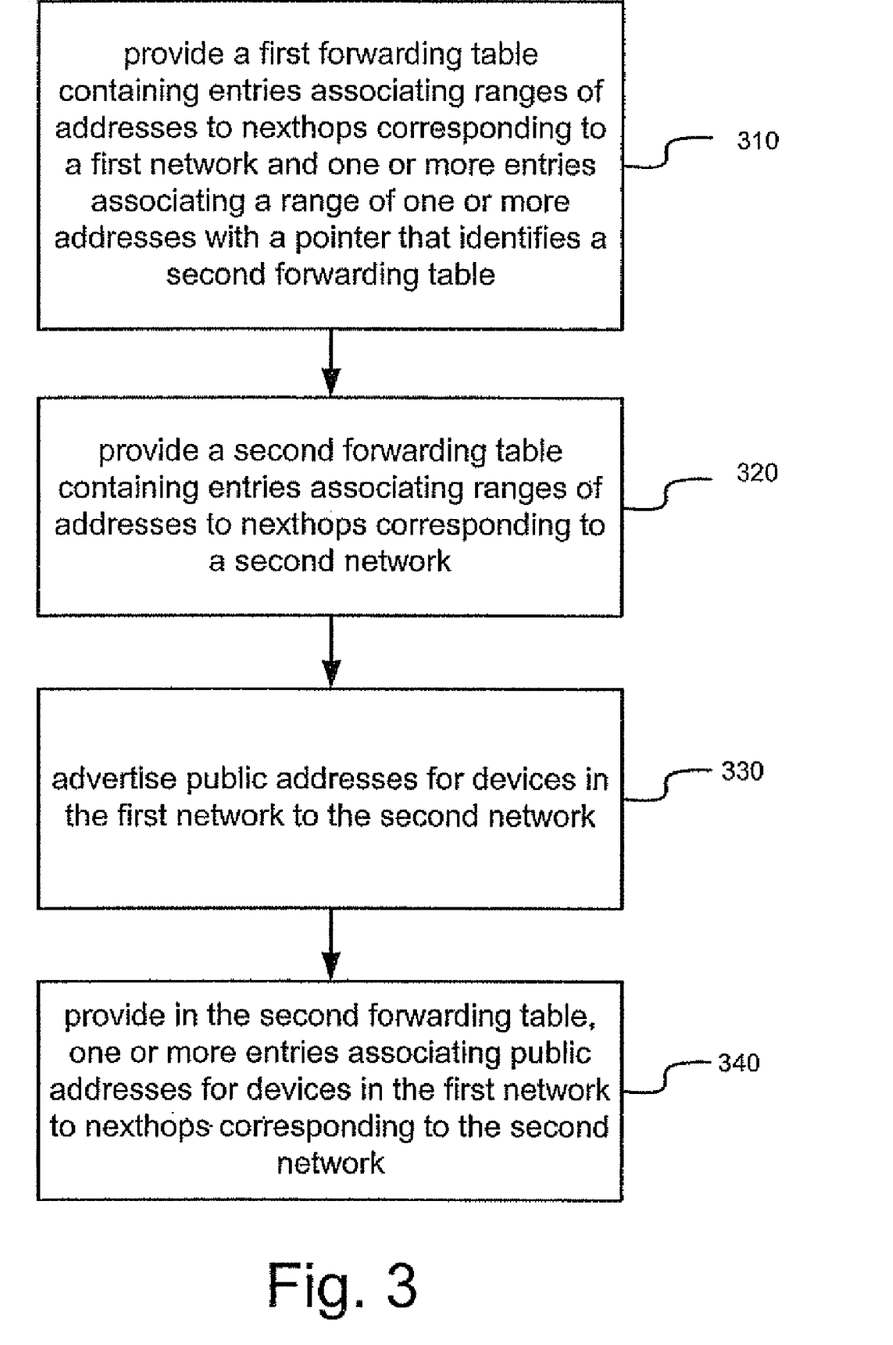
FIG. 3 is a flow diagram of a process for setting up forwarding tables in a router according to the invention.

FIG. 3 is a flow diagram of a process for creatin forwarding tables in a router (such as router 100 or 102). In this process, the router provides a first forwarding table (step 310). The first forwarding table contains entries associating ranges of addresses to nexthops in a first network and one or more entries associating a range of one or more addresses with a pointer that identifies the second forwarding table. The router provides the second forwarding table containing entries that associate ranges of addresses to nexthops in a second network (step 320). In alternative embodiments, additional forwarding tables may be provided and entries in each table may associate address ranges with pointers to any of the other tables.

The router advertises public addresses for devices in the first network to the second network (step 330). The router provides one or more entries in the second forwarding table associating public addresses for devices in the first network to nexthops corresponding to the second network (step 340). This allows the router to forward packets from devices in the second network directly to devices in the first network using the second component in a forwarding table. In an alternative embodiment, the second forwarding table could contain entries with pointers to the first forwarding table.

Figure 4:
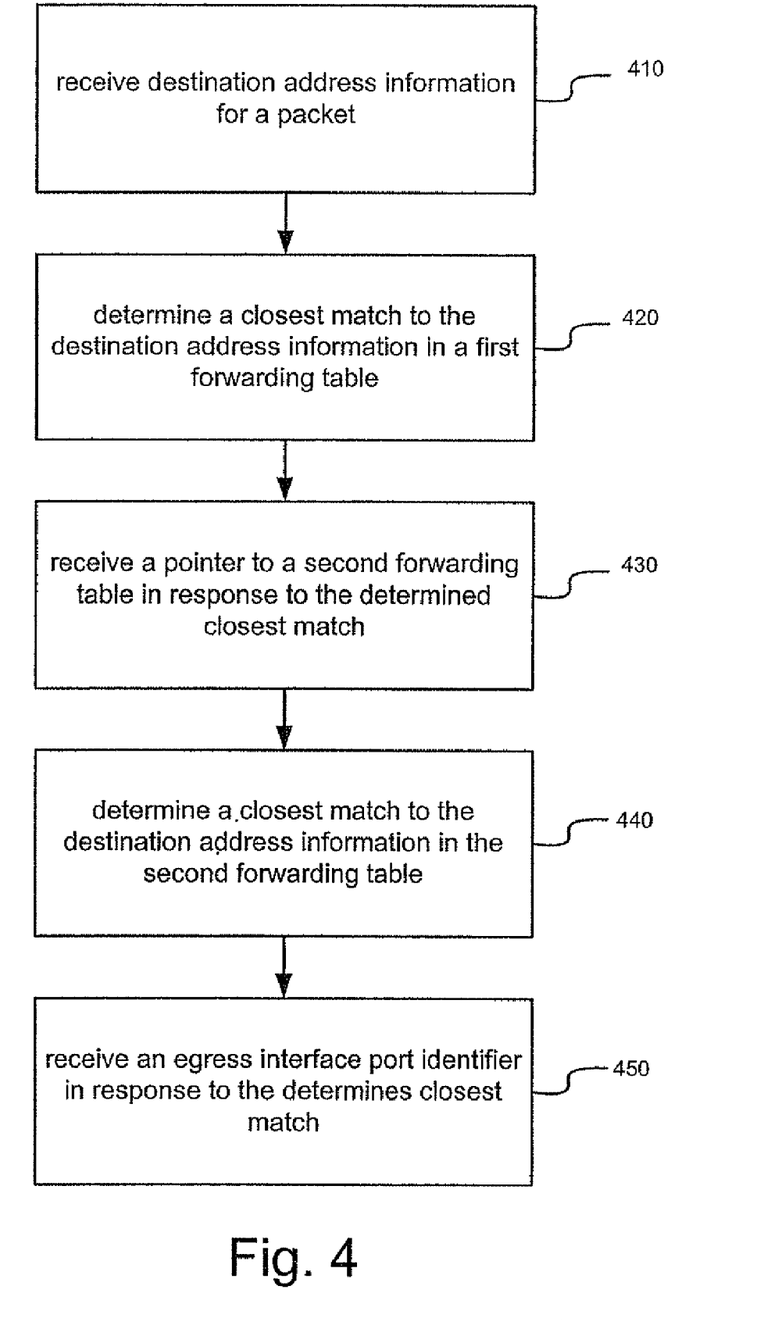
FIG. 4 is a flow diagram of a process for the operation of a router according to the invention.

FIG. 4 shows a flow diagram of a process for the operation of a component in a router (such as router 100 or 102). The component receives destination address information for a packet (step 410). The component determines a closest match to the destination address information in a first forwarding table (step 420). In response to the determined closest match, the component receives a pointer to a second forwarding table (step 430). The component determines a closest match to the destination address information in the second forwarding table (step 440). The component then receives an egress interface port identifier in response to the closest match (step 450). In appropriate cases (such as where the egress interface port is an Ethernet port), the component may also receive the address of the neighboring router to which the packet is to be sent. In alternative embodiments, lookup techniques other than closest match may be used.

Figure 5:
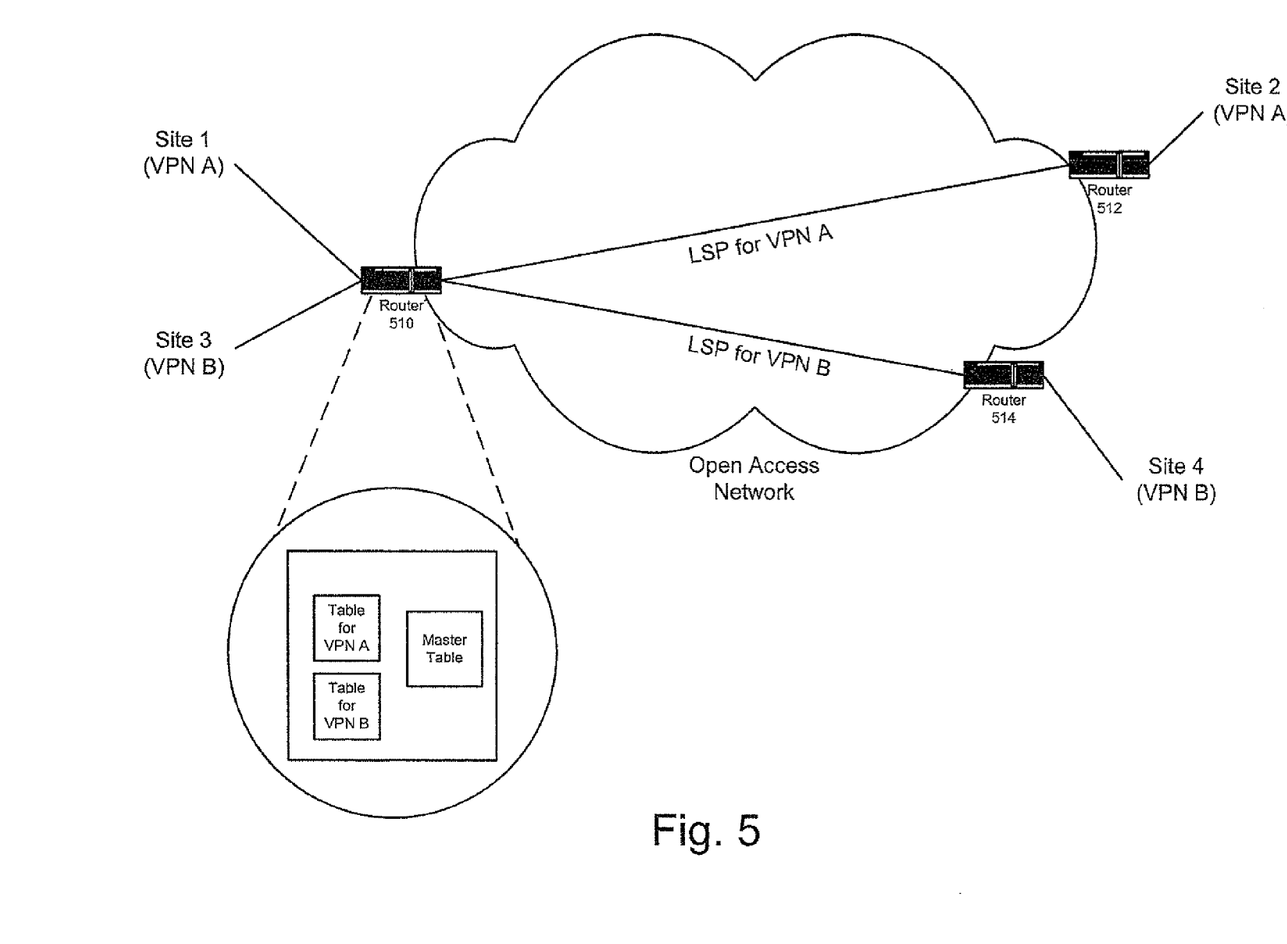
FIG. 5 illustrates an example of a network in which the invention may be used.

FIG. 5 shows an example of a network in which the invention may be used. As shown in FIG. 5, an open access network (such as the public Internet) contains three routers at its edge (router 510, router 512, and router 514). Each of these routers not only carries traffic for the open access network, but also for one or more virtual private networks (VPNs). Router 510, for example, carries traffic for the open access network, as well as for VPN A and VPN B. Router 512 carries traffic for the open access network and VPN A, and router 514 carries traffic for the open access network and VPN B. Routers 510, 512, and 514 may be similar to router 100 (described in connection with FIG. 1A) or router 102 (described in connection with FIG. 1B).

As shown in FIG. 5, router 510 contains three forwarding tables. The first table is for VPN A traffic, the second table is for VPN B traffic, and the third table is a master table for the open access network. Router 510 uses the table for VPN A to perform lookups for packets received on ingress interface ports dedicated to VPN A and to forward the packets to egress interface ports dedicated to VPN A. Router 510 uses the table for VPN B in a similar fashion for interface ports dedicated to VPN B. Router 510 uses the master table to perform lookups for packets received at ingress interface ports dedicated to the open access network and to forward the packets to any of the egress interface ports. As described in further detail in connection with FIG. 3, public addresses for devices in VPN A and VPN B are advertised to the open access network and are included in the master table. When packets come in from the open access network, the lookup processor can use the master table to determine a corresponding egress interface port, which may be dedicated to any of VPN A, VPN B, or the open access network.

One or more of the tables contained in router 510 contain entries with pointers to another table. For example, the forwarding table for VPN A may contain one or more entries with pointers to the master table. This allows packets received at ingress interface ports dedicated to VPN A to be forwarded into the open access network by performing a lookup operation on the table for VPN A and then a lookup operation on the master table. The forwarding table for VPN A may also have one or more entries with pointers to the forwarding table for VPN B, allowing packets to be forwarded from the VPN A network to the VPN B network through lookups in the VPN A forwarding table and in the VPN B forwarding table.

Routers 512 and 514 contain forwarding tables for VPN A traffic and the open access network and forwarding tables for VPN B traffic and the open access network, respectively. As with router 510, one or more forwarding tables in each of routers 512 and 514 may contain one or more entries with pointers to other tables.

Other embodiments of the invention will be apparent to those skilled in the art from consideration of the specification and practice of the invention disclosed herein. For example, while the invention has been described in connection with a router, the invention may also be used in a switch or other packet forwarding device. Further, while the invention has been described in connection with the tables (router tables and forwarding tables), the invention may also use route or forwarding information stored in other data structures/forms or in databases. In addition, while the invention has been described in connection with pointers and forwarding tables to other forwarding tables, pointers to other types of tables could also be used (such as routing tables). It is intended that the specification and examples be considered as exemplary only, with a true scope and spirit of the invention being indicated by the following claims.

What is claimed is:

1. A method performed by a network device, comprising:
    receiving, at the network device, a packet including a destination address;
    providing, by the network device, a first forwarding table and a second forwarding table, the first forwarding table including a plurality of entries, a first one of the plurality of entries including information identifying a device in a first network and a second one of the plurality of entries including a pointer to the second forwarding table, the second forwarding table including a plurality of entries including information identifying a plurality of devices in a second network that differs from the first network;
    determining, by the network device, that the destination address corresponds to a discrete address range associated with the second one of the plurality of the entries in the first forwarding table including the pointer to the second forwarding table; and
    identifying, by the network device and based on the destination address, an entry in the second forwarding table, pointed to by the pointer and associated with the discrete address range, that identifies one or more of the devices in the second network.

2. The method of claim 1, where the entry in the first forwarding table is an entry having a closest match to the destination address.

3. The method of claim 1, where the determining further comprises:
    determining a default entry, in the first forwarding table, to correspond to the destination address when no other one of the plurality of entries in the first forwarding table more closely matches the destination address.

4. The method of claim 1, where the identifying further comprises:
    determining a default entry, in the second forwarding table, to correspond to the destination address when no other one of the plurality of entries in the second forwarding table more closely matches the destination address.

5. The method of claim 1, further comprising:
    identifying an identifier for an output port associated with the identified entry in the second forwarding table.

6. The method of claim 5, further comprising:
    forwarding, based on the identifier, the packet to the output port.

7. The method of claim 5, where the identifying an identifier for an output port further comprises:
    identifying an identifier to an output port and an address to a neighboring device connected to the identified output port.

8. The method of claim 1, where a type of the first network differs from a type of the second network.

9. The method of claim 1, where the first network is a private network and the second network is a public network.

10. The method of claim 1, where the first network is a first private network, and the second network is a second private network.

11. The method of claim 1, where the identifying an entry in the second forwarding table further comprises:
    determining that the identified entry in the second forwarding table a pointer to a third forwarding table; and identifying, based on the destination address, an entry, of a plurality of entries, in the third forwarding table that identifies one or more devices in a third network, where the third network differs from the first and second networks.

12. The method of claim 1, where each of the plurality of entries in the first forwarding table and the second forwarding table correspond to ranges of one or more destination addresses.

13. A device, comprising:
an input port to receive a packet including destination address information;
a first forwarding table and a second forwarding table, the first forwarding table including a plurality of entries, one of the plurality of entries including information identifying a device in a first network or a pointer to the second forwarding table, the second forwarding table including a plurality of entries including information identifying a plurality of devices in a second network that differs from the first network; and
processing logic to:
identify that the one entry, from the plurality of entries in the first forwarding table, associates a discrete address range to the destination address information to the pointer to the second forwarding table, and
identify, based on the destination address information, an entry, of a plurality of entries in the second forwarding table, that corresponds to the discrete address range and identifies one or more of the devices in the second network.

14. The device of claim 13, further comprising:
a plurality of output ports associated with the first network; and
a plurality of output ports associated with the second network,
where the processing logic is further to forward the packet to a particular one of the output ports associated with the second network, where the identified entry in the second forwarding table designates the particular output port.

15. The device of claim 14, where a type of the first network differs from a type of the second network.

16. The device of claim 13, where one of the plurality of entries in second forwarding table includes a pointer to a third forwarding table, the device further comprising:
the third forwarding table, including a plurality of entries including information identifying a plurality of devices in a third network that differs from the first and second networks, where the processing logic is further to identify, based on the discrete portion of the destination address information, an entry, of the plurality of entries, in the third forwarding table, that identifies one or more of the devices in the third network.

17. The device of claim 16, where a type of the third network differs from types of the first and second networks.

18. The device of claim 13, where the entry in the first forwarding table corresponds to a range of one or more destination addresses.

19. A packet forwarding device, comprising:
a plurality of ingress interface ports at which packets are received;
a plurality of egress interface ports from which the packets are output;
a first forwarding table including output port identifiers associated with a first network and corresponding destination addresses included in received packets, the first forwarding table further including a pointer to a second forwarding table associated with a particular range of destination addresses;
the second forwarding table including output port identifiers associated with a second network and corresponding to the particular range of destination addresses, where a type of the first network differs from a type of the second network; and
a router lookup module to identify, when a received packet includes a destination address corresponding to the particular range of destination addresses, an output port identifier associated with the second network among the entries in the second forwarding table.

* * * * *